S. R. TUCKER.
Apparatus for Soldering Metal Tubing.
No. 152,709.          Patented June 30, 1874.
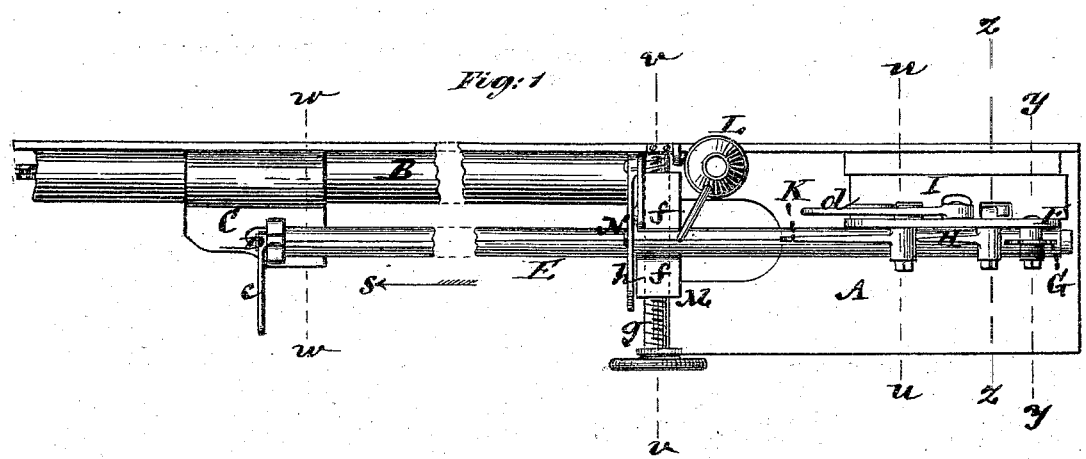
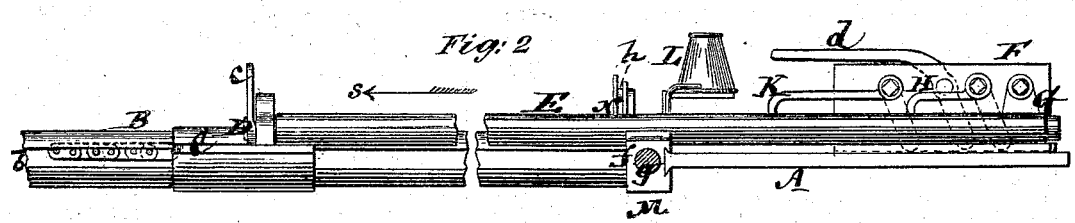
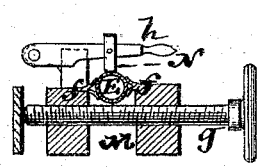
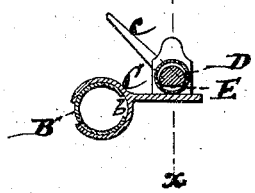
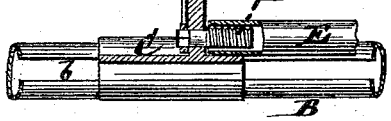
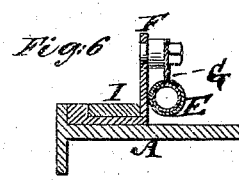
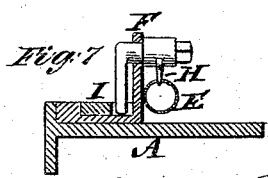
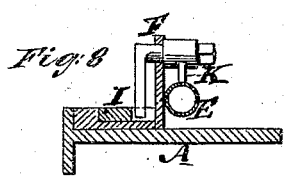
Witnesses:         S. R. Tucker
Michael Ryan     by his Attorneys
Fred Haynes     Brown & Allen
AM. PHOTO-LITHOGRAPHIC Co. N.Y. (OSBORNE'S PROCESS.)

UNITED STATES PATENT OFFICE

SAMUEL R. TUCKER, OF BROOKLYN, NEW YORK, ASSIGNOR TO THE BROOKLYN BRASS AND COPPER COMPANY, OF SAME PLACE.

IMPROVEMENT IN APPARATUS FOR SOLDERING METAL TUBING.

Specification forming part of Letters Patent No. 152,709, dated June 30, 1874; application filed May 14, 1874.

*To all whom it may concern:*

Be it known that I, SAMUEL R. TUCKER, of Brooklyn, in the county of Kings and State of New York, have invented certain Improvements in Apparatus for Soldering Metal Tubing, of which the following is a specification:

My invention consists, generally, in apparatus for soldering split sheet-metal tubing, and in which the tubing to be seated is moved longitudinally for operation in connection with devices for opening and scraping the seam or joint for smearing it with acid, and guiding and closing it preparatory to soldering, and for outside scraping or finishing the soldered seam; also, in which a mutilated threaded clamp is used for holding and moving the tubing.

In the accompanying drawing, Figure 1 represents a plan of an apparatus constructed according to my invention, and with a piece of tubing in the course of operation. Fig. 2 is a front elevation of the same; Fig. 3, a transverse section on the line $v\ v$; Fig. 4, a similar view on the line $w\ w$; Fig. 5, a section on the line $x\ x$; Fig. 6, a transverse section on the line $y\ y$; Fig. 7, a similar view on the line $z\ z$; and Fig. 8, a like view on the line $u\ u$.

A is a bracket or table, to which is attached a long hollow or tubular horizontal rail, B, having a longitudinal slit or opening, $b$, in its front, the same forming an outside way for a clamping-carriage, C, along it, and an inside way for an endless chain, by which said carriage is moved to and fro along the rail. The carriage or slide C is fitted with a threaded clamp, D, which may be a screw working in a suitable bearing on the carriage, and operated by a lever or handle, $c$, said screw having its axis parallel with the rail B, and being of a mutilated construction or flattened on its one side, as represented in Figs. 4 and 5. Instead of the thread on the clamp, however, being a continuous one, it may be made up of a series of independent threads or rings. This mutilated threaded clamp is inserted in the one end of the tube E to be operated on, and the turning of it in the one direction causes its threaded portion to draw upon and bear against the interior of the tubing E to give a firm grasp or hold of the same for the purpose of effecting the longitudinal movement of the tubing in common with the carriage C, and which clamp, accordingly as it is turned to the right or the left, insures a quick and firm hold and rapid release of the tubing, as required. At the rear end of the table A is a plate or structure, F, which carries in front of it, at or near the end where the tubing E is first entered, a tube-opener, G, which consists of a short mandrel fitting within the tubing, and a dividing knife-blade or arm that passes through the split in the tubing E, and is adjustably pivoted or bolted to the plate F, so that when running the tubing back said tube-opener may be swung back or out of the way. This tube-opener serves, as the carriage is run forward in direction of the arrow $s$, not simply to guide and steady the tubing, but to open or keep open the split in the tubing for an inside scraper, H, pivoted to the plate F, and operated through a lever or arm by a horizontal slide, I, in the rear of the plate F, to enter in between the split of the tubing E, kept from closing by the tube-opener G, and so to scrape the inner edges of said split as the tubing is moved forward. There is also pivoted to the plate F, in advance of the inside-edge scraper H, and connected in like manner with the slide I, an outside scraper, K, which scrapes and cleans the outside of the split in the tubing. These scrapers H and K may be held to their places by means of a spring connected with the slide I, and be lifted or relieved from contact, when required, by a lever or handle, $d$, applied to said slide. The tubing E having the inner and upper edges or surfaces of its split thus scraped and cleaned, has its seam run under the spout of a sulphuric-acid can or vessel, L, and from thence through jaws $f\ f$ of a closing clamp and guide, M, operated by a right and left hand threaded screw, $g$.

The operator, with his solder and irons, standing in the vicinity of the closing clamp and guide M, hermetically seals the seam or joint of the tubing thus scraped or cleaned and prepared for the operation.

N is an outside scraper or clearer, which may be operated by a lever or handle, *h*, connected with the one sliding half of the closing guide and clamp M, said scraper being brought down on the soldered seam of the tubing during its back run to wipe or clean off surplus solder from the tubing.

By apparatus constructed as described, split-metal tubing may have its seams hermetically soldered or closed, and a neat finish given to the same with accuracy and dispatch.

I claim—

1. The tube-opener G, in combination with a clamping-carriage, C, for operation on and with the split tubing, substantially as specified.

2. The inside-edge scraper H, in combination with the tube-opener G and the clamping-carriage C, essentially as described.

3. The combination of the outside-edge scraper K with the inside-edge scraper H, the tube-opener G, and clamping-carriage C, substantially as specified.

4. The mutilated threaded-clamp D, in combination with the carriage C, essentially as and for the purpose herein set forth.

SAML. R. TUCKER.

Witnesses:
HENRY T. BROWN,
MICHAEL RYAN.